United States Patent
Ziobro

(10) Patent No.: US 7,453,468 B2
(45) Date of Patent: Nov. 18, 2008

(54) INTELLIGENT COLOR TO TEXTURE CONVERTER

(75) Inventor: James M. Ziobro, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 359 days.

(21) Appl. No.: 09/725,384

(22) Filed: Nov. 29, 2000

(65) Prior Publication Data

US 2002/0063719 A1    May 30, 2002

(51) Int. Cl.
G09G 5/02 (2006.01)
G09G 5/00 (2006.01)
G06K 9/00 (2006.01)
G06K 9/38 (2006.01)
H04N 1/40 (2006.01)

(52) U.S. Cl. .................. 345/596; 345/582; 382/168; 382/170; 382/273; 358/3.01

(58) Field of Classification Search .......... 345/596, 345/589, 582, 440; 382/168–172, 162, 167, 382/165, 254, 273; 358/1.1–3.23, 520, 501, 358/522, 530

See application file for complete search history.

(56) References Cited

U.S. PATENT DOCUMENTS

| | | | |
|---|---|---|---|
| 4,149,194 A | 4/1979 | Holladay | 358/3.23 |
| 4,369,461 A | 1/1983 | Tamura | |
| 4,688,031 A * | 8/1987 | Haggerty | 345/600 |
| 4,903,048 A | 2/1990 | Harrington | 347/115 |
| 5,153,576 A * | 10/1992 | Harrington | 345/596 |
| 5,291,310 A | 3/1994 | Levien | 358/3.2 |
| 5,315,406 A | 5/1994 | Levien | 358/3.2 |
| 5,365,602 A | 11/1994 | Levien | 382/299 |

(Continued)

FOREIGN PATENT DOCUMENTS

DE    195 13 030 C1    7/1996

(Continued)

OTHER PUBLICATIONS

European Search Report, Place of Search—The Hague, Date of Completion of Search—Sep. 15, 2003.

(Continued)

*Primary Examiner*—Chante Harrison
(74) *Attorney, Agent, or Firm*—Fay Sharpe LLP

(57) ABSTRACT

A method for preserving color information in a black and white version of a color image includes the analysis of the color image. The analysis comprises a search for conflicting colors. Conflicting colors are colors that are normally transformed to the same gray level in a black and white version of the image. One embodiment, working in a CIELAB color space includes the use of a three dimensional histogram for detecting predominant colors having the same luminance. Such colors are classified as conflicting colors. Modulations are added to the gray scale versions of conflicting colors in order to make them distinguishable. Modulation is only applied to conflicting colors thereby minimizing any deleterious effect and allowing the method to be applied in a "walk up mode" of an image processor. An image processor operative to perform the method includes an image analyzer operative to find and classify conflicting colors in the color image, and a gray scale modulator operative to add modulations to gray scale versions of only the conflicting colors within a gray scale version of the color image.

15 Claims, 8 Drawing Sheets

U.S. PATENT DOCUMENTS

| | | | |
|---|---|---|---|
| 5,418,895 A * | 5/1995 | Lee | 345/604 |
| 5,444,556 A | 8/1995 | Ito et al. | |
| 5,557,430 A * | 9/1996 | Isemura et al. | 358/530 |
| 5,588,093 A | 12/1996 | Harrington | 358/1.9 |
| 5,598,204 A | 1/1997 | Harrington | 347/251 |
| 5,612,792 A * | 3/1997 | Ichikawa et al. | 358/500 |
| 5,612,793 A * | 3/1997 | Ito et al. | 358/530 |
| 5,625,716 A | 4/1997 | Borg | |
| 5,638,192 A | 6/1997 | Yoshida | |
| 5,680,230 A * | 10/1997 | Kaburagi et al. | 358/520 |
| 5,701,401 A | 12/1997 | Harrington et al. | 358/1.9 |
| 5,726,781 A * | 3/1998 | Isemura et al. | 358/530 |
| 5,900,886 A * | 5/1999 | Shay | 345/691 |
| 5,917,614 A | 6/1999 | Levien | |
| 5,956,157 A | 9/1999 | Tai | |
| 5,978,011 A | 11/1999 | Jacob et al. | |
| 6,014,233 A | 1/2000 | Fan et al. | 358/515 |
| 6,078,687 A * | 6/2000 | Venkateswar | 382/169 |
| 6,088,137 A * | 7/2000 | Tomizawa | 358/538 |
| 6,204,934 B1 | 3/2001 | Minamino | |
| 6,462,834 B1 * | 10/2002 | Yamamoto et al. | 358/1.9 |
| 6,463,173 B1 * | 10/2002 | Tretter | 382/168 |
| 6,473,532 B1 | 10/2002 | Sheraizin et al. | |
| 6,516,100 B1 * | 2/2003 | Qian | 382/305 |
| 6,556,311 B1 * | 4/2003 | Benear et al. | 358/1.9 |
| 6,711,287 B1 * | 3/2004 | Iwasaki | 382/165 |

FOREIGN PATENT DOCUMENTS

| | | |
|---|---|---|
| EP | 0 473 433 A2 | 3/1992 |
| EP | 0 577 048 A1 | 1/1994 |
| EP | 0 711 068 A2 | 5/1996 |
| EP | 0 559 471 B1 | 10/1997 |
| EP | 0 823 811 A2 | 2/1998 |
| JP | 4234261 | 8/1992 |
| JP | 4335789 | 11/1992 |
| JP | 11017961 | 1/1999 |
| JP | 11-069156 A | 3/1999 |

OTHER PUBLICATIONS

Communication—European Search Report.

* cited by examiner

*FIG. 4*

```
                          ,— 423
AT GRAY LEVELS 128-135    a*                                        ,— 410
   0  0  0  0  0  0  0   0    0    0   0   0  0  0  0  0
   0  0  0  0  0  0  0   0    0    0   0   0  0  0  0  0
   0  0  0  0  0  0  0   0    0    0   0   0  0  0  0  0
   0  0  0  0  0  0  0   0    0    0   0   0  0  0  0  0
   0  0  0  0  0  0  0   0    0    0   0   0  0  0  0  0
b* 0  0  0  0  0  0  0   0   40  230   4   0  0  0  0  0
   0  0  0  0  0  0  0   0    2    0   0   0  0  0  0  0
   0  0  0  0  0  0  0 284  548   54 334   0  0  0  0  0
   0  0  0  0  3 27  0  47 2642    0   0   0  0  0  0  0
   0  0  0  0 60 45  0   0    2    0   0   0  0  0  0  0
   0  0  0  0  0  0  0   0    2    0   0   0  0  0  0  0
   0  0  0  0  0  0  0   0    0    1 1372 12  0  0  0  0
   0  0  0  0  0  0  0   0    0    0  106 36  0  0  0  0
   0  0  0  0  0  0  0   0    0    0   0   0  0  0  0  0
   0  0  0  0  0  0  0   0    0    0   0   0  0  0  0  0
   0  0  0  0  0  0  0   0    0    0   0   0  0  0  0  0
```

*FIG. 5*

```
                         ,— 424                 428
AT GRAY LEVELS 136-143                                              ,— 414
  0  0  0  0  0  0  0   0    0    0   0   0  0  0  0
  0  0  0  0  0  0  0   0    0    0   0   0  0  0  0
  0  0  0  0  0  0  0   0    0    0   0   0  0  0  0
  0  0  0  0  0  0  0   0    0    0   0   0  0  0  0
  0  0  0  0  0  0  0   0    1    7   0   0  0  0  0
  0  0  0  0  0  0  0  24 16135 225  0   0  0  0  0
  0  0  0  0  0  0  0   0    2    0   0   0  0  0  0
  0  0  0  0  0  0 330 601    3  451  0   0  0  0  0
  0  0  0  0  0 69  2  70  271    4  0   0  0  0  0
  0  0  0  0  0 41  0   0    0    1  0   0  0  0  0
  0  0  0  0  0  0  0   0    2    0  0   0  0  0  0
  0  0  0  0  0  0  0   0    0  314 133  0  0  0  0
  0  0  0  0  0  0  0   0    0  397 772  0  0  0  0
  0  0  0  0  0  0  0   0    0    0   0   0  0  0  0
  0  0  0  0  0  0  0   0    0    0   0   0  0  0  0
  0  0  0  0  0  0  0   0    0    0   0   0  0  0  0
```

INTELLIGENT COLOR TO TEXTURE CONVERTER

BACKGROUND OF THE INVENTION

1. Field of the Invention

The invention relates to the art of image rendering. It finds application where color images are rendered with a single colorant. For example, the invention finds application in repro-graphic machines where a color image is scanned and then transformed for rendering so that black and white copies of the color image can be made. The invention finds further application in general-purpose computing devices such as personal computers and business graphics authoring devices. In the latter devices, color images, such as, for example, bar and pie charts are created in color and displayed on a computer display. Thereafter, single colorant versions of the color images may be printed on, for example, black and white printers.

2. Description of Related Art

Communicating concepts and ideas to others can be difficult. One method often used to communicate ideas to a group of people is to make a visual presentation. In a visual presentation, images such as charts, graphs and photographs are often displayed before an audience while a speaker explains and describes the significance of the images. Alternatively, the images can act as summaries of an associated speech. Typically, the images are presented in color. Color often adds to the impact and clarity of an image. For example, a pie chart or a bar graph is easier to read if its various sections are presented in different colors.

Copies of visual presentation material are often distributed to the audience members. The distributed materials serve to document the presentation. The distributed material can help audience members follow the presentation and can serve as a study aid or reference material.

Unfortunately, it can be impractical or prohibitively expensive to distribute a large number of color copies of presentation material. Furthermore, in some cases, color reproduction equipment is not readily available. In these cases the color images are often reproduced in black and white.

Creating black and white versions of color images can be problematic. Typically, a great deal of information is lost in the conversion to black and white. For example, typical color image authoring devices can produce over sixteen million different colors, while typical black and white rendering devices can only produce two hundred fifty six shades of gray. Obviously, a great number of colors must be mapped to each level of gray. Therefore, portions of a color image that are quite obviously different colors can appear to be the same color when the image is rendered in black and white. When the image portions in question are, for example, different sections of a pie chart or bar graph, this loss of information can render the chart or graph useless.

Attempts have been made to alleviate this problem by using texturing to increase the number of ways colors can be represented in a black and white image. For example, one texturing or patterning technique is described in U.S. Pat. No. 4,903,048 to Harrington. Typically, under these strategies, the conversion to black and white is accomplished by dividing a color space into a finite number of bins and assigning a different halftone pattern to each of the bins. This approach does preserve more information from the color image. However, this approach can lead to abrupt transitions in the black and white image, which may not be desired in some applications. In this regard, where colors in the original image smoothly blend from one color to another, the blend in color can cross a bin boundary, resulting in a sudden shift in a halftone pattern or level. This situation can be further aggravated by the presence of noise in the image. For example, a subtle jitter or shift in the color in a photograph of a persons face can be transformed into dramatic changes in halftone patterns if the jitter or shift is across one or more bin boundaries.

All halftoning methods by definition introduce some distortion in the output image. Designers of halftoning methods typically make tradeoffs in representing the visual parameters of spatial detail versus tonal fidelity. The additional requirement to represent color statically in the halftone pattern reduces the capability of the halftoning system to represent the two visual parameters. For this reason, where these techniques are used, they are generally not available in "walk up mode". Therefore, prior art image processors often have controls for various modes of operation which set tradeoffs between the visual parameters and the addition texture related features. The use of these controls puts an additional cognitive load on the "walk up" or casual users. The user must know the features are available and know how to use them. Thus it is a great advantage if the image processor can make intelligent choices on when and where to make the tradeoff of color representation. A method of generating black and white versions of color images is needed that preserves as much information as possible from an original color image, while minimizing the amount of distortion introduced into the black and white image. Furthermore, a method is needed that is invoked automatically when a particular image requires the use of the method, and then, only at points in the image that require it, thus providing "walk up mode" availability of the method.

BRIEF SUMMARY OF THE INVENTION

To those ends, a method for rendering an image, described in a multi-colorant color space, in a single-colorant color space has been developed. The method comprises the steps of examining the image to find conflicting colors in the image, creating a single colorant version of the image, and adding texture only to portions of the single colorant version of the image that are associated with the conflicting colors.

One embodiment of the method comprises the steps of collecting histogram information from the color image wherein bins within the histogram classify image pixels based, at least in part, on luminance and hue information, classifying peaks within the histogram that have similar luminance as conflicting colors, and applying modulation to at least some of gray scale versions of the conflicting colors thereby making the gray scale versions visually distinguishable from one another.

An image processor operative to carry out the method comprises an image analyzer operative to find and classify conflicting colors in a color image and a gray scale modulator operative to add modulations to gray scale versions of only the conflicting colors within a gray scale version of the color image.

In one embodiment, the image analyzer includes a histogram collector operative to classify pixels in the color image based, at least in part, on a characteristic that is also used to generate a single colorant version of the color image. The image analyzer also includes a conflicting color detector operative to examine the histogram and find pixels that are similar with respect to the characteristic that is used to generate a single colorant version of the image. The characteristic is, for example, a pixel luminance. The gray scale modulator includes a color relationship discriminator operative to receive conflicting color classification information from the image analyzer and color image pixel information. The gray scale modulator determines a relationship between the color image pixel and the conflicting color. The gray scale modulator further includes a modulation generator operative to add a variable gray scale modulation based on the relationship between the color image pixel and the conflicting color. The added modulations are applied to gray scale versions of the conflicting colors.

One advantage of the present invention is that it provides a method to add distinguishing texture to a black and white version of a color image only where the modulation is required.

Since, by the very nature of the present invention it only operates when it is absolutely necessary, an image processor operative to carry out the method can do so in a "walk up" or default mode of operation. This provides the advantage of freeing an image processor user from having to know about and manually invoke the method. Instead the method is invoked all the time and only operates to adjust an image when it is needed.

Another advantage of the present invention is the minimal distortion it adds to black and white versions of color images while maximizing information preservation.

Still other advantages of the present invention will become apparent to those skilled in the art upon a reading and understanding of the detail description below.

BRIEF DESCRIPTION OF THE SEVERAL VIEWS OF THE DRAWINGS

The invention may take form in various components and arrangements of components, and in various steps and arrangements of steps. The drawings are only for purposes of illustrating preferred embodiments, they are not to scale, and are not to be construed as limiting the invention.

FIG. 4-7 are representative samples taken from an exemplary 3-dimensional histogram used in an embodiment of the method of FIG. 3;

DETAILED DESCRIPTION OF THE INVENTION

Figure 1:
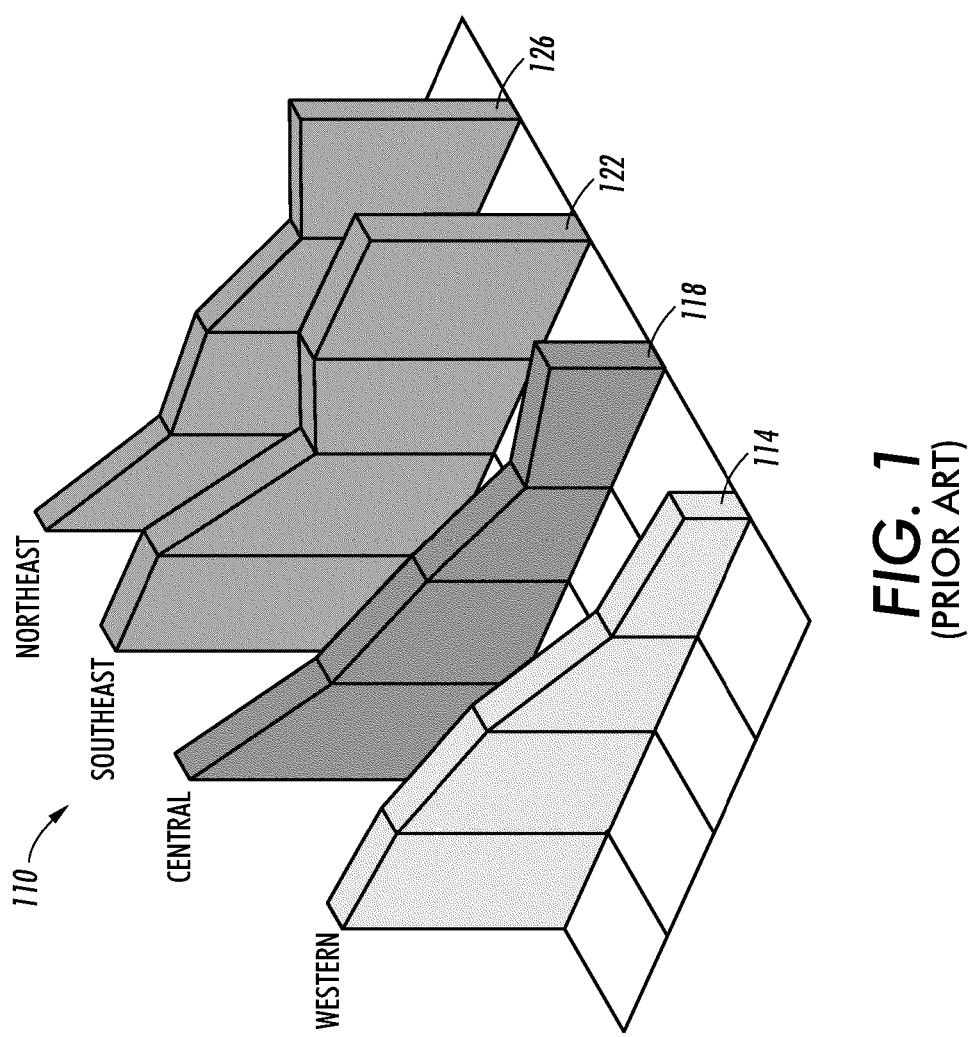
FIG. 1 is a black and white version of a color 3-dimensional bar graph rendered with a prior art image processor using a prior art method.

Referring to FIG. 1, a prior art image processor produces a prior art, black and white version 110 of a first color business graphic (not shown). The first color business graphic is a 3D bar graph representing, for example, first quarter sales by region. In the color version, a western region bar is rendered in, for example a dark yellow, a central region bar is rendered in, for example, a dark green, a southeast bar is rendered in, for example, a dark blue, and a northeast region bar is rendered in, for example dark red. In the prior art black and white version 110, a western region bar 114 is rendered in a very light gray. A central region bar 118 is rendered in a dark gray. A southeast region bar 122 and a northeast region bar 126 are both rendered in a medium gray. The medium gray is the same for both bars 122, 126. Bars that were originally visually distinct by virtue of being rendered in blue and red respectively now appear related. A viewer of the prior art black and white version 110 of the image is left wondering if the southeast 122 and northeast 126 regions are related in some way that the western 114 and central 118 regions are not. The viewer wonders, "If the southeast and northeast regions are not related, then why did the image author choose to render the bars 122, 126 with the same shade of gray?" The information lost due to the prior art image processing technique has rendered a clear and concise image confusing and aggravating.

Figure 2:
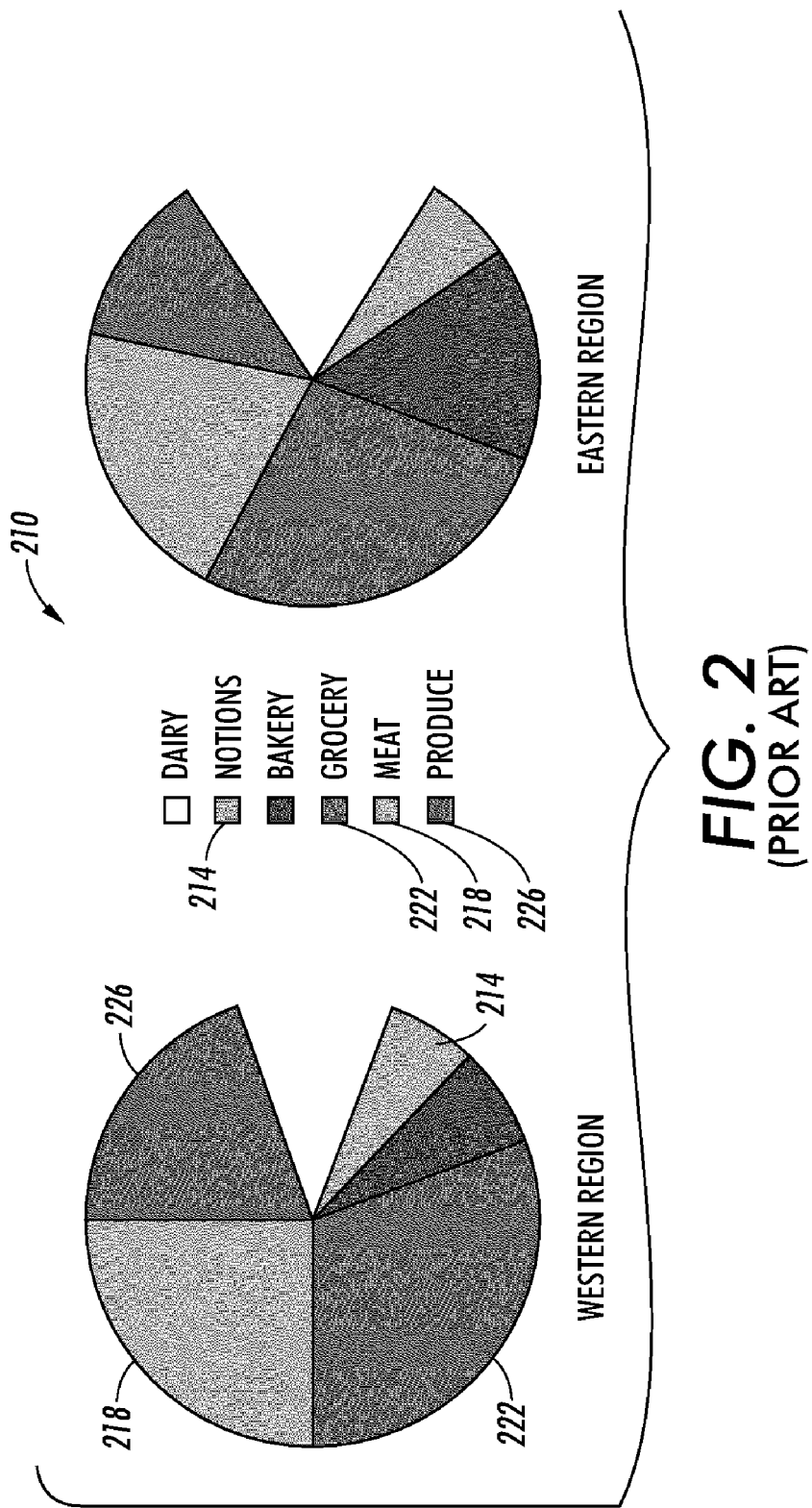
FIG. 2 is a black and white version of a color pie chart rendered with a prior art image processor using a prior art method.

Referring to FIG. 2, a prior art image processor produces a prior art, black and white version 210 of a second color business graphic (not shown). The color business graphic is a pie chart representing, for example, dairy revenue by region, further broken down by item classification. Each classification is represented in a pie wedge. In the color version, item classes are coded in different colors. For example, dairy items are coded in yellow, notions are shown in pink, bakery items are represented by navy blue, grocery items are indicated in blue, meat is illustrated with a reddish-orange and produce is rendered in green. In the prior art, black and white version 210 the various item classification are depicted in various shades of gray. The Notions 214 and Meat 218 categories are depicted in the same shade of gray. Additionally, the grocery 222 and produce 226 categories are depicted in shades of gray that are very similar. As a result, the viewer cannot tell which wedge represents notions 214 and which wedge represents meat 218. Additionally, the viewer must struggle to determine which wedge represents grocery 222 revenue and which wedge represents produce 226 revenue. Wedges that were originally visually distinct by virtue of the colors the wedges were rendered in, are indistinguishable in the prior art, black and white version 210 of the chart. Again, the information lost due to the prior art image processing technique has rendered a clear and concise image confusing and aggravating.

Figure 3:
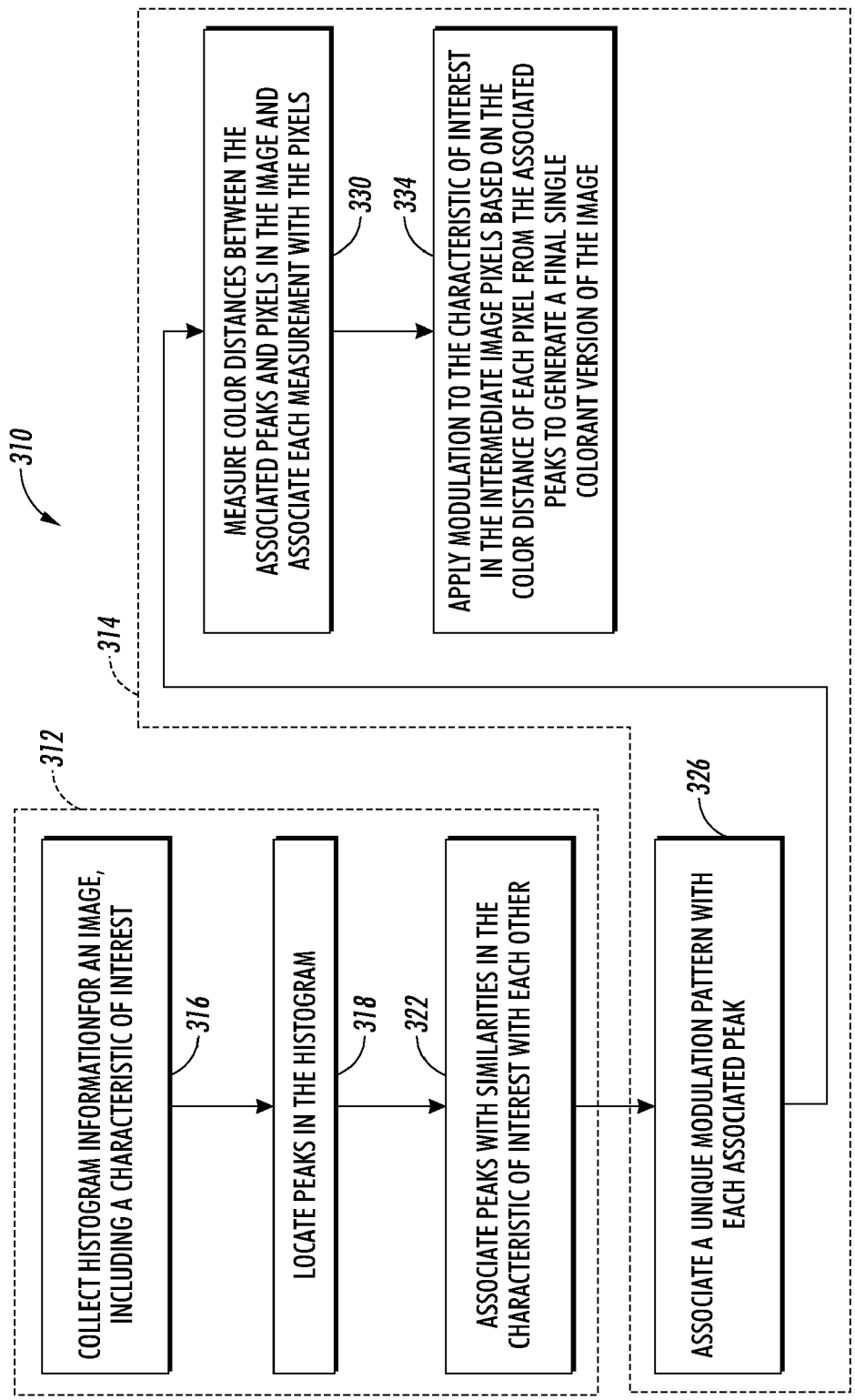
FIG. 3 is a flow chart outlining an intelligent method for generating a single colorant version of a multicolor image.

Referring to FIG. 3, an intelligent method 310 for generating a single colorant version of a multicolor image comprises an image examination step 312 and a single colorant version creation step 314. In the image examination step, the image is examined to find conflicting colors in the image. In the single colorant version creation step 314, a single colorant version of the image is created wherein texture is added, preferably, only to portions of the single colorant version of the image that are associated with the conflicting colors.

One embodiment of the image examination step 312 begins with a histogram collection step 316. The purpose of the histogram collection step is to group and count image pixels based on a characteristic of interest. For example, pixel luminance is used in transforming color images to black and white images. Therefore, pixel luminance is a characteristic of interest. The well-known Commission International de l'Eclairage or International Commission on Illuminations L*a*b* color space (CIELAB) maps colors in a machine independent, perceptually uniform, three-dimensional color space. One of the dimensions is luminance (L*). CIELAB is a convenient color space to use when luminance is a pixel characteristic of interest. The other two dimensions, a* and b* describe a colors hue. When the colors in an image are described in the CIELAB color space it is convenient to analyze them using a three dimensional histogram. Every occurrence of a particular L*a*b* color is counted. For example, every time an image pixel is found that has the pixel value L*=157, a*=77, b*=146 a corresponding counter is incremented. Likewise, counters corresponding to other pixel values are incremented for each occurrence of pixels of those values. In a peak location step 318, the histogram is examined to find colors that predominate in or make up major portions of the image. When found, these colors are identified and classified as peak colors or color centroids. For example, where pixels of a particular color make up more than a threshold percentage of the image, they are classified as belonging to a peak color. Alternatively, the location of a color centroid—which is a function of the location and height of a peak, as well as the number, height and location of neighboring peaks—could be used (as described below) to classify pixels as belonging to a particular peak color. In a peak association step 322, peak colors that share the same or similar luminance are associated with one another and labeled as conflicting colors. Typically, the definition of "similar luminance" is a function of a perceived gray scale capability of a target image-rendering device. For example, different colors may be said to have a similar luminance (or other characteristics of interest) if the target image-rendering device would render a single colorant version of the colors so that the single colorant versions of the colors would be difficult for an observer to distinguish.

One embodiment of the single colorant version creation step 314 begins with a modulation association step 326, wherein a modulation is associated with each of the conflicting colors. The modulations are to be applied to single colorant versions of the colors. For example, colors with the same luminance are transformed to the same level of gray for rendering in black and white. As illustrated in reference to FIG. 1, this often leads to the unacceptable result that image portions that are quite distinctly different colors are rendered as the same shade of gray. However, where this embodiment of the intelligent method 310 for generating a single colorant version of a multicolor image is used, the modulation association step 326 assigns a modulation, such as, for example, a unique pattern, to each conflicting color. For example, a unique screen such as a unique line screen can be applied to the single colorant, or black and white version, of each conflicting color. In a color distance measurement step 330, a relationship between the conflicting colors and image pixels is determined. Preferably, a perceptually uniform color space is used as the basis for comparing colors. For example, the CIELAB color space is used to compare colors in the image. One way to compare colors is to measure a distance between the peak colors and the colors of image pixels. Methods of measuring a distance between colors in a color space are known in the art. For example, the equation $D=\Delta L^2+\Delta a^2+\Delta b^2$ is used to measure the distance between colors in the CIELAB color space. The measured distances are recorded in association with the image pixels. In a modulation application step 334, modulations are added to the single colorant or gray scale versions of the image. For example, an image pixel is assigned the modulation pattern of the closest conflicting peak. The amplitude of the modulation is a function of the color distance of the pixel to the conflicting peak color. For example, pixels that are the same color as a conflicting color are modulated at one hundred percent of the modulation assigned to that conflicting color. Colors that are nearby a conflicting color are also modulated with the modulation assigned to that conflicting color. However, the modulation is applied at a reduced amplitude. For example, based on a color's distance from a conflicting color, a black and white version of the color might be modulated only forty percent of the modulation amplitude assigned to the conflicting color.

Preferably, the amplitude of modulation rolls off quickly. Such steep roll offs are achievable with steep slope linear attenuation functions. However, non-linear functions can also be used. One reason for modulating colors beyond the single peak color is that printed colors that appear to be one uniform color can actually be made of up a range of colors. In such a case, it is preferable to modulate all the component colors. Additionally, imperfections in scanning equipment can result in pure image tones being recorded as a range of colors.

For example, referring to FIGS. 4-7, first 410, second 414, third 418, and fourth 422 portions of a histogram of a business graphics image show the image comprises only a small number of clusters of colors. Each portion 410, 414, 418, 422 of the histogram represents a different range of levels in a characteristic of interest. The characteristic of interest is used in the generation of a single colorant or gray scale version of the image. For example, each portion 410, 414, 418, 422 of the histogram represents a first 423, second 424, third 425 and fourth 426 range of luminance or gray levels respectively. At each range of luminance or gray levels 423, 424, 425, 426 the color of pixels is further described by values in a* and b*. The a* and b* scales are broken down into, for example, sixteen subsections. Therefore at each luminance level range (L*) pixels are further classified into one of two hundred fifty six bins. Each bin represents a small range of a*b* values. In an embodiment of histogram collection step 316, each pixel in the image is examined and the bin corresponding to an L*a*b* value of the pixel is incremented. Each number shown in the histogram portions 410, 414, 418, 422 represents the final tally in a bin.

In an embodiment of peak location step 318, the histogram is examined in order to find peaks and/or clusters of predominant image colors. For example, referring to FIG. 4, the bins of the first histogram portion are compared, for instance, to a peak definition threshold. For example, bins having a final tally of over ten thousand are considered to identify colors that represent a significant portion of the image. Ten thousand is given as an example only. Typically, a peak definition threshold is determined based on the number of pixels in the image. None of the bins in the first histogram portion 410 contain a tally over ten thousand. Therefore, none of the colors represented by first histogram portion 410 bins are labeled as conflicting peaks.

Referring to FIG. 5, the second histogram portion 414 is also examined. A first peak bin 428 is determined to contain a tally that exceeds the peak definition threshold. For example, the first peak bin 428 contains a tally of 16,135, which is greater than the peak definition threshold of 10,000. However, no other bins in the second histogram portion 414 contain tallies that exceed the peak definition threshold. Therefore, none of the colors represented by first histogram portion 414 bins are labeled as conflicting peaks.

Figure 6:
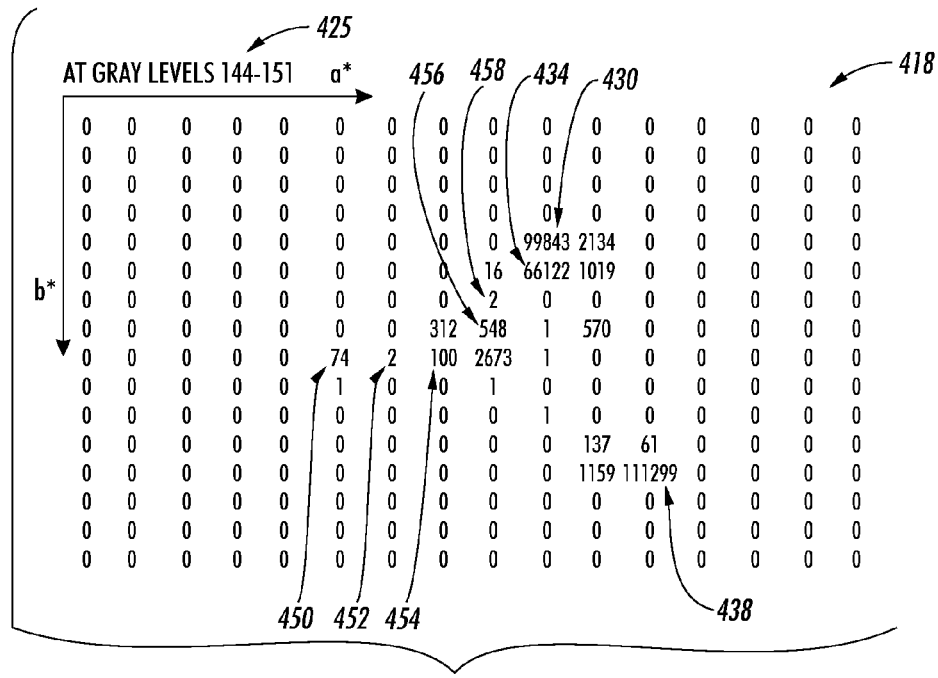

Referring to FIG. 6, the third histogram portion 418 is examined. Second 430, third 434 and forth 438 peak pins are located and determined to contain tallies above the peak definition threshold. The third histogram portion 418 contains more that one peak bin. Therefore, in a peak association step 322, each third histogram portion 418 peak bin 430, 434, 438 is labeled a conflicting peak and histogram examination continues.

Figure 7:
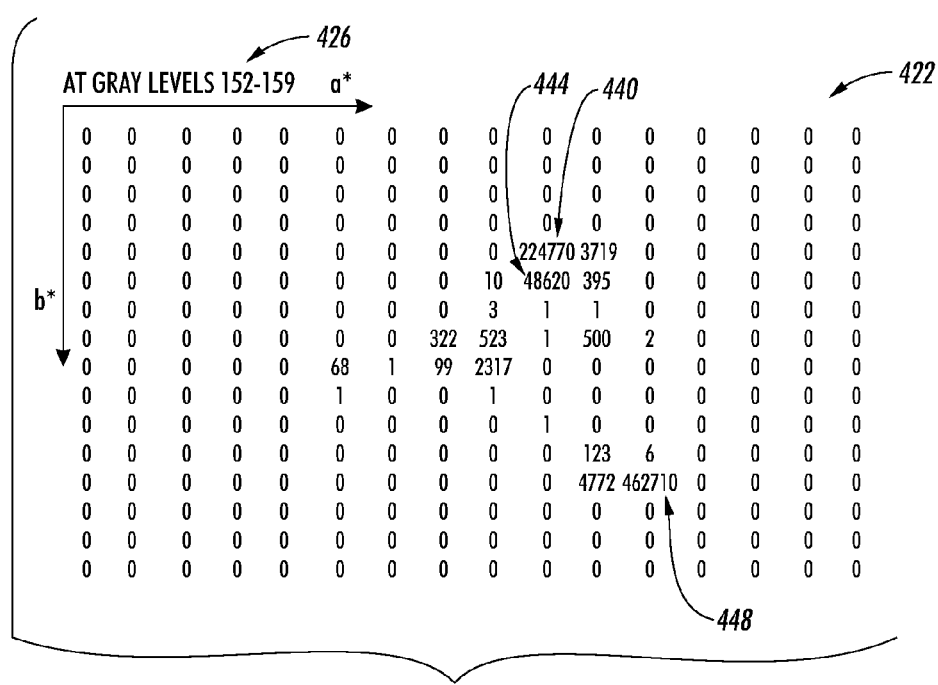

Referring to FIG. 7, the fourth histogram portion 422 is examined. Fifth 440, sixth 444 and seventh 448 peaks are identified. Since the fifth 440, sixth 444 and seventh 448 peaks are in the same histogram portion 422, they are labeled as conflicting peaks.

In some embodiments of the peak association step 322, the definition of a peak may be adjusted. For example, in some embodiments, peaks are located in exact correspondence to the location of each bin that exceeds the peak definition threshold. In other embodiments, the location of peaks is adjusted to take into account the tallies in neighboring bins. For example, in some embodiments, the tallies and locations of neighboring second 430 and third 434 peak bins are combined to define a first centroid peak located in color space at a point between the locations of the second 430 and third 434 peak bins. For example, the first centroid is located in color space at a tally-weighted distance between the second 430 and third 434 peak bins. For example, the first centroid is located four tenths of the way from the second peak 430 to the third peak 434. The first centroid is located closer to the second peak 430 because the second peak 430 tallies sixty percent of the pixels represented by the combination of the second 430 and third 434 peaks. The location of the centroid may also be influenced by neighboring bins in neighboring histogram portions. For example, first 430, second 434, fourth 440 and fifth 444 peak bins may be combined to define a second centroid located in color space between the first 430, second 434, forth 440 and fifth 444 peak bins not only within an a*b* plane, but also between a*b* planes of different but neighboring gray levels. In still other embodiments the definition of a peak or centroid is further modified to take into account an influence of non-peak bins that neighbor peak bins. Furthermore, the effect of a chain or cluster of non-zero bins can also be taken into account. For example, with reference to FIG. 6, the influence of a first non-peak bin 450 is accounted for in some embodiment because a chain of non zero bins including second 452, third 454, fourth 456 and fifth 458 non-peak bins tie the first non-peak bin 450 to the third 434 and second 430 peak bins. Chains can also extend across histogram portions. Consideration of chained non-peak bins is not preferable. Where it is used, limits are usually placed on the length of the chain. For images that contain very few or zero bins, such as, for example, images that contain full color photographs, these limits help prevent the detrimental extension of chains throughout the entire histogram.

In whatever way peaks are defined, at the end of the peak association step 322, peaks with similar characteristics of interest, such as, for example, peaks with a similar luminance, are labeled as conflicting with each other. Modulations are associated with the conflicting colors, attenuation factors are determined for colors near the conflicting colors in color space, and attenuated modulations are added to gray scale versions of the conflicting colors to generate a single colorant version of the image.

In summary, there are a number of ways to define the location or color of a peak. For example, once a cluster is defined around a peak, the statistical mean location of the cluster's pixels in L*a*b* space can be calculated. Under this system, the color distance of step 330 can be measured in standard deviations from the mean. Alternatively, the peak in any cluster may be simply defined as the bin location tallying the largest number. In that case, the color distance of step 330 can be measured in, for example, bin index increments. However color distance is measured, it is used as an attenuation control signal in the modulation application step 334 in order to add varying degrees of modulation to component pixels of a conflicting clusters or peaks.

Figure 8:
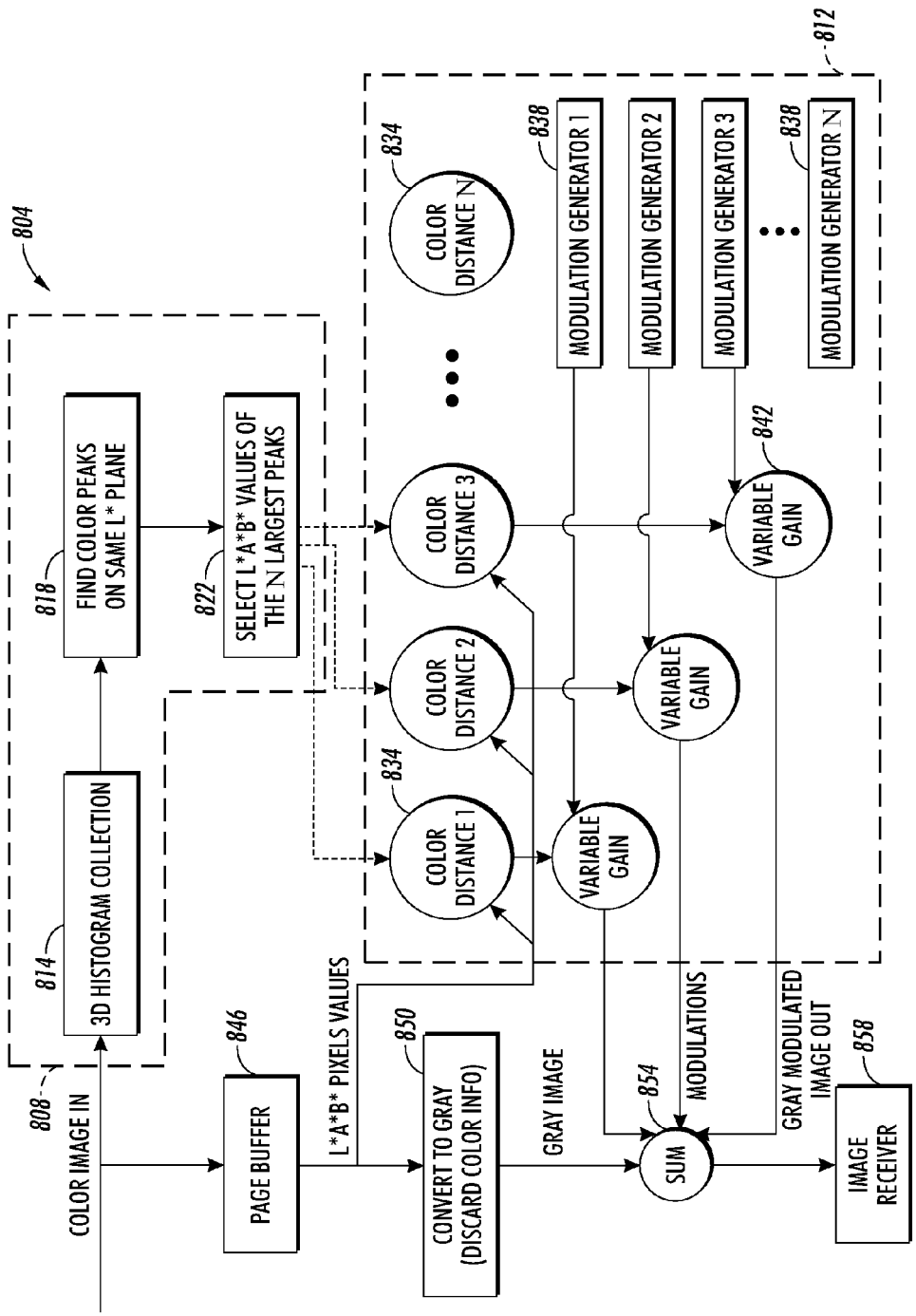
FIG. 8 is a block diagram of an embodiment of a color image processor operative to perform the method of FIG. 3.

Image processors, such as, for example, document processors, copiers, and personal computers, operative to perform the intelligent method 310, for generating a single colorant version of a multicolor image, take many forms. Such an image processor can be analog or digital, hardware based or software based, or based on any combination of those technologies and others. Referring to FIG. 8, one image processor 804 operative to carry out the intelligent method 310 for generating a single colorant version of a multicolor image comprises an image analyzer 808 and a gray scale modulator 812. The image analyzer 808 is operative to find and classify conflicting colors in the color image. The gray scale modulator 812 is operative to add modulations to gray scale versions of only the conflicting shades within a gray scale version of the color image. In this exemplary embodiment, the image analyzer 808 comprises a histogram collector 814, a peak locator 818, and a conflicting color detector 822. The gray scale modulator comprises a plurality of distance measurers 834, a plurality of modulation generators 838 and a plurality of modulation attenuators 842. The image processor also includes a page buffer 846, a gray scaler 850, a summer 854 and an image receiver 858. The histogram collector 814 and the page buffer 846 each receive a copy of the image. Typically, the page buffer 846 holds the image while the histogram collector 814, peak locator 818 and conflicting color detector 822 analyze the image. The histogram collector 814 fills an array with pixel count information.

For example, in a system operating in CIELAB space, the histogram collector 814 defines and fills a three dimensional array. The indexes or dimensions into the array are L*, a* and b*. Each pixel in an image is analyzed to determine the pixels L*, a* and b* values. The L*, a* and b* values are used as indexes into the array and the value of that array location is incremented. This process is repeated for every pixel in the image. When every pixel has been accounted for, access to the array information is granted to the peak locator 818. The peak locator scans the array and looks for array locations containing values that exceed a threshold value. The threshold value can be fixed or it can vary depending on image size or some other parameter. The index values (L*, a*, b*) of array locations that contain values above the threshold value are recorded and presented to the conflicting color detector 822 as, for example, a list of peaks. The conflicting color detector 822 searches for clusters of peaks that have the same or similar luminance values (L*). Peaks that belong to such clusters are labeled conflicting colors and are added to a conflicting color list. Peaks that are not labeled conflicting colors are dropped from consideration and are not candidates for modulation. The location in color space (L*a*b*) of each conflicting color is loaded into a distance measurer 834. Additionally, a modulation generator 838 is assigned to each conflicting color. The distance measures 834 examine each pixel in the image in the page buffer 846 and deliver adjustment signals to associated modulation attenuators 842. The adjustment signals are based on the measured color distance between the conflicting colors and the examined pixels. Each modulation attenuator 842 receives a modulation signal from one of the modulation generators 838 and delivers an attenuated version of the modulation signal to the summer 854. The amount of attenuation imposed by a particular modulation attenuator 842 is a function of the attenuation signal delivered from an associated distance measurer 834. Modulation attenuation can range from zero to one hundred percent. Therefore, each modulation attenuator 842 can deliver a one hundred percent to zero percent modulation signal to the summer 854. The summer also receives gray scale image pixel information from the gray scaler 850. The gray scaler 850 in turn receives color pixel information from the page buffer 846. In general, the gray scaler 850 creates gray scale pixels based on a characteristic of interest of the color pixels in the page buffer 846. In this particular case, the gray scaler 850 creates gray scale pixels based on the luminance of the pixels in the page buffer 846. Gray scale pixel information leaves the gray scaler 850 in synchronization with the pixels being examined by the distance measurers 834. Therefore, as gray scale pixel information enters the summer 854, the summer is also receiving modulation signals appropriate for that gray scale information. The summer 854 combines the gray scale information with the modulation signals and outputs appropriate single colorant mark information. That information is delivered to the image receiver 858. The image receiver 858 can be, for example computer memory, computer network, or a mass storage device such as a disk drive. Alternatively, the image receiver 858 can be a rendering device, such as, for example, a print engine or a monochrome monitor. The print engine may be, for example, a black and white printer such as, for example, a xerographic printer. Those of ordinary skill in the art will recognize that a xerographic printer comprises a fuser, a developer and an imaging member.

Figure 9:
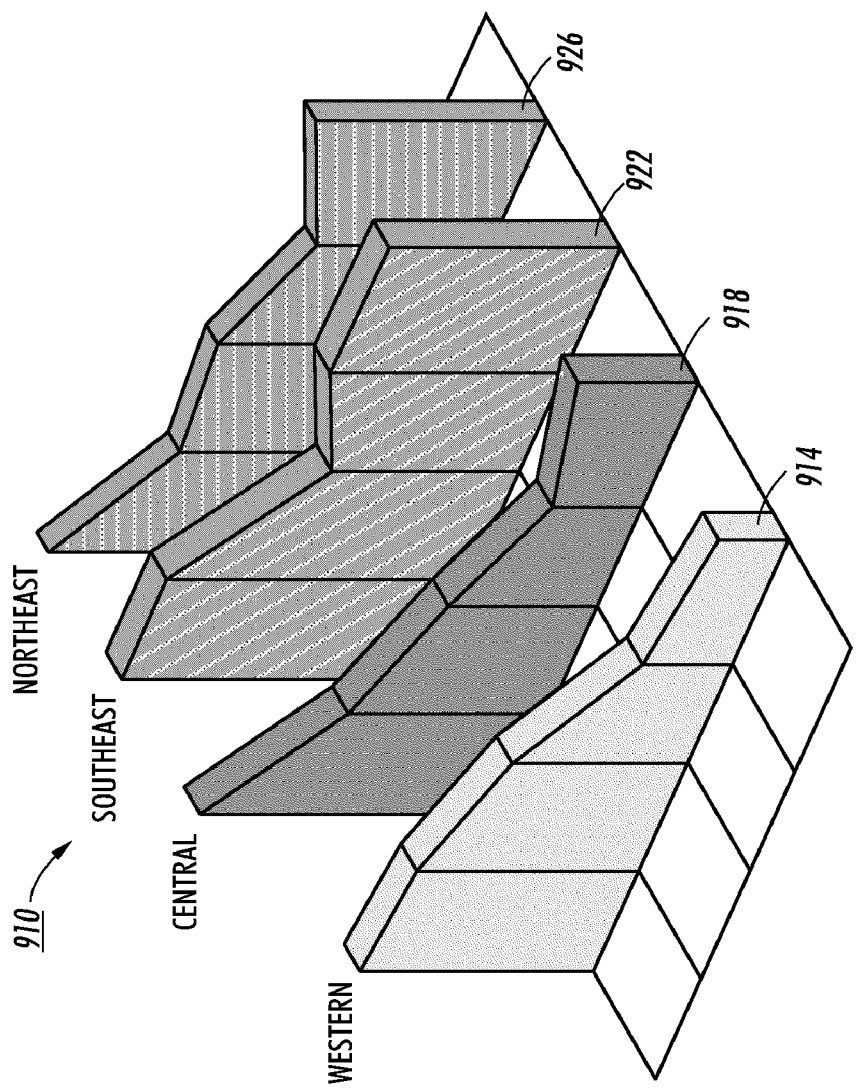
FIG. 9 is a black and white version of the color 3-dimensional bar graph referred to with reference to FIG. 1, rendered with the method of FIG. 3.

Referring to FIG. 9, an image processor operative to perform the method of FIG. 3 produces an improved black and white version 910 of the first color business graphic (not shown). In the improved black and white version 910, a western region bar 914 is rendered in a very light gray. A central region bar 918 is rendered in a dark gray. A southeast region bar 922 and a northeast region bar 926 are both rendered in a medium gray. The medium gray is the same for both bars 922, 926. However, the medium gray of the southeast region bar 922 is modulated with a downward sloping line screen and the northeast region bar 926 is rendered with an upward sloping line screen. Bars that were originally visually distinct by virtue of being rendered in blue and red respectively are maintained as visually distinct by virtue of being rendered with visually distinct modulations. At the same time, colors that do not conflict 914, 918 are rendered in levels of gray without modulation. A viewer of the improved black and white version 910 of the color image is not confused. The distinctness of the southeast bar 922 and the northeast bar 926 is maintained.

Figure 10:
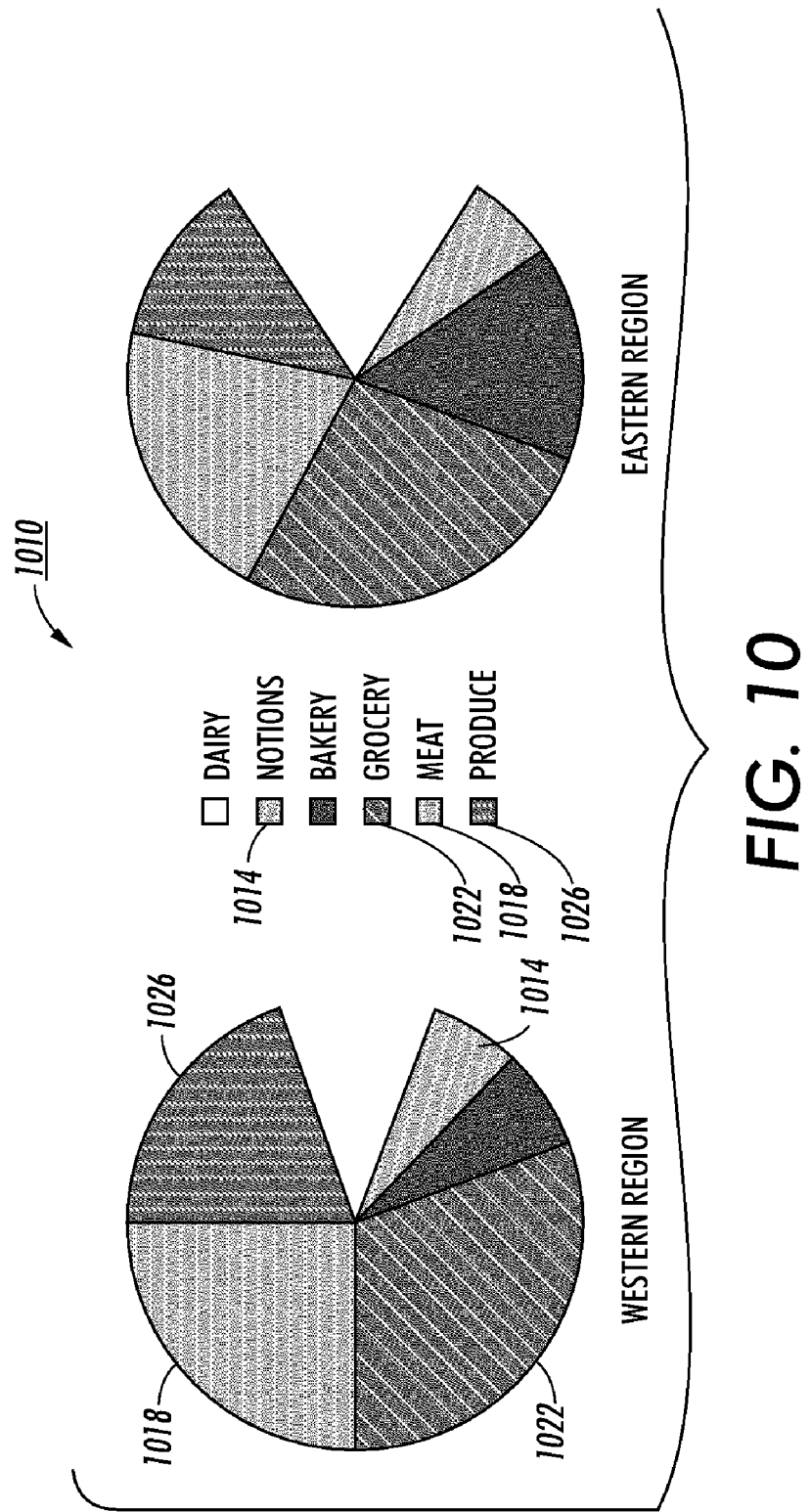
FIG. 10 is a black and white version of the color pie chart referred to with reference to FIG. 2, rendered with the method of FIG. 3.

Referring to FIG. 10, an image processor operative to perform the method of FIG. 3 produces an improved black and white version 1010 of the second color business graphic (not shown). As explained above, the second color business graphic is a pie chart. In the prior art black and white version of the image 210, the notions 214 and meat 218 categories were depicted in the same shade of gray. In the improved black and white version 1010, the shade of gray representing the notions 1014 category is modulated with 135-degree line screen and the meat 1018 category is modulated with a horizontal line screen. Additionally, the Grocery 1022 category is modulated with a 45-degree line screen and the produce 1026 category is modulated with a vertical line screen. As a result, the viewer can tell which wedge represents notions 1014 and which wedge represents meat 1018. Additionally, the viewer is able determine which wedge represents grocery 1022 revenue and which wedge represents produce 1026 revenue. Wedges that were originally visually distinct by virtue of the colors of the wedges, are maintained as visually distinct, by virtue of modulation, in the improved black and white version 1010 of the chart. It should be noted that the modulations are exaggerated for clarity in FIG. 10. Preferably, the effect of modulation is subtler. For example, FIG. 9 depicts a preferable level of modulation.

The invention has been described with reference to particular embodiments. Modifications and alterations will occur to others upon reading and understanding this specification. For example, characteristics other than luminance can be used in the creation of single colorant versions of an image. Therefore, characteristics other than luminance can be used in the detection of conflicting colors. Methods and devices other than histograms may be used to find conflicting peaks. For example, color image pixels can be compared against a predetermined list of known conflicting colors. Likewise, look up tables of predetermined color distances can be used instead of the color distance measurers. Many other image processor implementations are contemplated for carrying out the method of intelligent color conversion. Hardware, software, neural networks, application specific integrated circuits, programmable gate arrays and a host of other technologies can be used to implement versions of the image processor. It is intended that all such modifications and alterations are included insofar as they come within the scope of the appended claims or equivalents thereof.

What is claimed is:

1. A method for preparing an image described in a multi-color color space for rendering, in a single-colorant color space, the method comprising:

collecting histogram information from the multi-color color space image wherein bins within the histogram classify image pixels based on luminance information and hue information;

classifying peaks within the histogram that have similar luminance as conflicting colors;

applying at least one distinct spatial modulation to, and only to, at least one respective single colorant version of at least one of the conflicting colors in a single colorant version of the image, thereby ensuring that all single colorant versions of colors in the image are visually distinguishable from one another while minimizing distortions in a remainder of the single colorant version of the image; and at least one of storing and rendering the single colorant version of the image.

2. The method of claim 1 further comprising before classifying, locating peaks within the histogram data.

3. The method of claim 1 wherein applying spatial modulation further comprises associating a unique modulation to the single colorant versions of each of the conflicting colors.

4. The method of claim 1 further comprising:

measuring a color distance between at least one pixel in the image and at least one conflicting color; and, applying an attenuated spatial modulation to at least one pixel in the single colorant version of the image, the attenuation ranging from zero to one hundred percent of a reference modulation, the level of attenuation being a function of the measured color distance.

5. The method of claim 4 wherein applying an attenuated modulation further comprises:

applying an attenuated spatial modulation to at least one pixel in the single colorant version of the image, the attenuation ranging from zero to one hundred percent of a reference modulation, the level of attenuation being a non-linear function of the measured color distance.

6. The method of claim 4 wherein the step of applying an attenuated modulation further comprises:

applying an attenuated spatial modulation to at least one pixel in the image, the attenuation ranging from zero to one hundred percent of a reference modulation, the level of attenuation being a linear function of the measured color distance.

7. An image processor operative to generate a single colorant version of a color image, the single colorant version including modulations only where necessary to distinguish between conflicting colors, the image processor comprising:

an image analyzer operative to find and classify conflicting colors in the color image;

a gray scale modulator operative to add spatial modulations to single colorant versions of only the conflicting colors within the single colorant version of the color image wherein the gray scale modulator further comprises a color relationship discriminator operative to receive conflicting color classification information from the image analyzer and color image pixel information, the color relationship discriminator operative to determine a relationship between the color image pixel and the conflicting color and wherein the gray scale modulator further comprises:

a spatial modulation attenuator operative to attenuate a gray scale modulation based on the relationship between the color image pixel and the conflicting color.

8. An image processor operative to generate a single colorant version of a color image, the single colorant version including modulations only where necessary to distinguish between conflicting colors, the image processor comprising:

an image analyzer operative to find and classify conflicting colors in the color image;

a gray scale modulator operative to add spatial modulations to single colorant versions of only the conflicting colors within the single colorant version of the color image wherein the gray scale modulator further comprises a color relationship discriminator operative to receive conflicting color classification information from the image analyzer and color image pixel information, the color relationship discriminator operative to determine a relationship between the color image pixel and the conflicting color and wherein the relationship between the conflicting color and the color image pixel comprises a color distance within a color space.

9. The image processor of claim 8 wherein the image analyzer further comprises:

a histogram collector operative to classify pixels in the color image based on a characteristic that is also used to generate the single colorant version of the color image.

10. The image processor of claim 9 wherein the image analyzer further comprises:

a conflicting color detector operative to examine the histogram and find pixels that are similar with respect to the characteristic that is used to generate the single colorant version of the image.

11. The image processor of claim 8 wherein the image gray scale modulator further comprises:

a spatial modulation generator operative to generate a gray scale spatial modulation for application to a single-colorant version of a color.

12. The image processor of claim 8 wherein the image processor further comprises an image receiver.

13. The image processor of claim 12 wherein the image receiver further comprises a xerographic printer.

14. An image processor operative to generate a single colorant version of a color image, the single colorant version including modulations only where necessary to distinguish between conflicting colors, the image processor comprising:

an image analyzer operative to find and classify conflicting colors in the color image;

a gray scale modulator operative to add spatial modulations to single colorant versions of only the conflicting colors within the single colorant version of the color image wherein the gray scale modulator further comprises a color relationship discriminator operative to receive conflicting color classification information from the image analyzer and color image pixel information, the color relationship discriminator operative to determine a relationship between the color image pixel and the conflicting color and wherein the relationship between the conflicting color and the color image pixel comprises a color distance within a perceptually uniform color space.

15. An image processor operative to generate a single colorant version of a color image, the single colorant version including modulations only where necessary to distinguish between conflicting colors, the image processor comprising:

an image analyzer operative to find and classify conflicting colors in the color image;

a gray scale modulator operative to add spatial modulations to single colorant versions of only the conflicting colors within the single colorant version of the color image wherein the gray scale modulator further comprises a color relationship discriminator operative to receive conflicting color classification information from the image analyzer and color image pixel information, the color relationship discriminator operative to determine a relationship between the color image pixel and the conflicting color and wherein the relationship between the conflicting color and the color image pixel comprises a color distance within a CIELAB color space.

* * * * *